United States Patent [19]

Ingle

[11] B 3,914,758

[45] Oct. 21, 1975

[54] DIGITAL READOUT FOR DISPLAYING BOTH LONG TERM AND SHORT TERM AVERAGE VALUES OF A SIGNAL

[75] Inventor: James Flagg Ingle, Fair Haven, N.J.

[73] Assignee: Bell Telephone Laboratories, Incorporated, Murray Hill, N.J.

[22] Filed: Apr. 16, 1973

[21] Appl. No.: 351,493

[44] Published under the Trial Voluntary Protest Program on January 28, 1975 as document no. B 351,493.

[52] U.S. Cl. .............................. 340/336; 324/122
[51] Int. Cl.² ........................................ G09F 9/32
[58] Field of Search ...................... 324/99, 96, 122; 340/324 R, 324 M, 336, 166 EL

[56] References Cited
UNITED STATES PATENTS
| | | | |
|---|---|---|---|
| 3,343,155 | 9/1967 | Pahlavan | 340/336 |
| 3,626,289 | 12/1971 | Vinson et al. | 324/96 |
| 3,648,270 | 3/1972 | Metz et al. | 340/324 AD |
| 3,766,474 | 10/1973 | MacDonald | 324/122 |

*Primary Examiner*—John W. Caldwell
*Assistant Examiner*—Marshall M. Curtis
*Attorney, Agent, or Firm*—Thomas Stafford

[57] ABSTRACT

A visual indication of both the long term average amplitude value and the instantaneous variations therefrom of a signal is obtained by employing a plurality of display units. A number of the display units is employed to display the long term average value. The instantaneous variations in the signal amplitude are displayed by selectively illuminating individual elements of a display unit in accordance with a prescribed code. The intensity of illumination of the display unit elements is proportional to the time interval that the instantaneous amplitude value is at an amplitude value assigned to the individual elements. Thus, a visual indication of the instantaneous value of the signal is realized by observing the relative brightness of the display unit elements.

5 Claims, 1 Drawing Figure

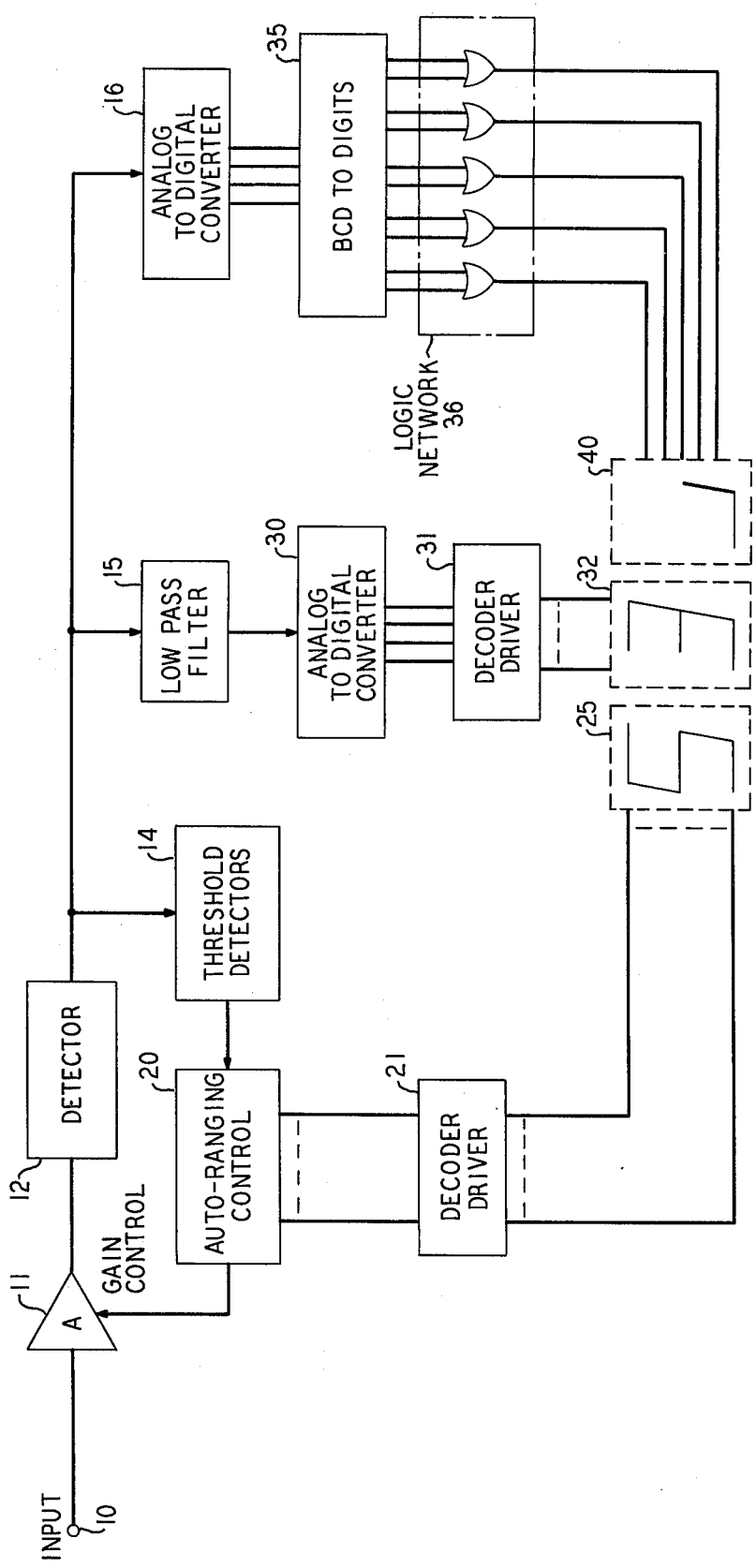

DIGITAL READOUT FOR DISPLAYING BOTH LONG TERM AND SHORT TERM AVERAGE VALUES OF A SIGNAL

BACKGROUND OF THE INVENTION

This invention relates to display arrangements and more particularly to digital display arrangements for indicating both long term average and short term values of a signal.

In measuring the magnitude of numerous signals, for example, noise and the like, it is desirable to obtain an indication of both the long term average value of the signal and the instantaneous deviations from the average value. Heretofore, meter movements of various types well known in the art have been employed for this purpose. For example, a meter having a scale calibrated in volume units (VU) has long been utilized in making noise measurements. A visual indication of the instantaneous amplitude of a noise signal is obtained by observing the position(s) of the meter indicating needle on an appropriate scale. For example, the maxima and minima of the needle positions indicate the instantaneous "spread" in the amplitude of the noise signal. An observer determines the long term average value of the noise signal by estimating the average position of the indicating needle and, then, ignoring the moving needle, reads the average value from the meter scale. Typically, such meters are extremely sensitive devices and, therefor, not suited for use in "rugged" environments. Additionally, accuracy of the measurements made utilizing such meters relied to a great degree upon the skill of a human observer.

In an attempt at overcoming some of the limitations of display systems which employ meter movements and the like, so-called gas tubes have been employed in display systems. The gas tubes have a plurality of spatially separate elements each of which has a unique shape for indicating an individual digit. A human operator may then obtain a visual indication of the average value of a signal by observing which one of the individual elements of the least significant digit of the display is illuminated most of the time. The observation of the instantaneous value of the signal may become very difficult if both most and least significant digits change. Although such systems have had a modicum of success, they also have undesirable features which limit their application. For example, gas tubes generally require "high" voltage sources and are relatively expensive. Additionally, the size and shape of the gas tubes limit their use to relatively large display apparatus. Thus, although gas tubes are satisfactory for certain display system applications, they are unsatisfactory for others; especially, "small" portable battery operated test equipment.

SUMMARY OF THE INVENTION

These and other problems are overcome in accordance with the inventive principles to be described herein in a digital display system adapted for yielding an indication of both the long term average value and instantaneous variations therefrom of a signal being evaluated. The instantaneous variations of a signal are visually indicated, in accordance with the invention, by selectively illuminating predetermined elements of a display device in accordance with a pre-established code scheme related to the instantaneous value of the signal being evaluated.

In one embodiment of the invention, a signal to be evaluated is supplied to a detector for obtaining a unidirectional signal representative of the peak value of the signal. Signals from the detector are supplied to a plurality of threshold detectors, a low-pass filter and an analog-to-digital converter. The threshold detectors are employed to determine the most significant digit(s) of the long term average value of the signal being evaluated and to generate signals for controlling the amplitude of the signal being evaluated. Typically, the amplitude of the signal being evaluated is maintained via a controllable amplifier to be within a predetermined amplitude range. The amplitude control signals are also employed to generate signals for illuminating appropriate elements of at least a first display unit. Signals developed at the output of the low-pass filter represent the least significant digit of the long term average value of the signal being evaluated. This least significant digit signal is converted into digital form, decoded and supplied to illuminate appropriate elements of at least a second display unit.

Digital signals representative of the instantaneous value of the least significant digit of the detected signal are supplied via a logic network, in accordance with the invention, to individual elements of a third display unit. The intensity of illumination of the individual elements of the third display unit is proportional, in accordance with the invention, to the time interval that the temporal amplitude value of the signal being evaluated is at a value assigned to the individual elements of the display unit. Thus, a visual indication of the instantaneous value of the signal is realized by observing the relative brightness of the individual elements of the third display unit, while the average value is observed from the illuminated elements of the first and second display units. Therefore, a visual indication of both the long term average and instantaneous values of a signal are simultaneously available.

These and other objects and advantages of the invention will be more fully understood from the following detailed description of an illustrative embodiment thereof taken in connection with the appended drawing which depicts in simplified block diagram form apparatus illustrating the invention.

DETAILED DESCRIPTION

The FIGURE illustrates a display system in accordance with the invention. Accordingly, a signal to be evaluated is supplied via input terminal 10 to controllable amplifier 11. Amplifier 11 may be any one of numerous amplifiers known in the art having controllable gain capability. Amplifier 11 is employed in a well-known fashion to maintain the signal level developed at its output within a desired range.

Signals developed at the output of amplifier 11 are supplied to detector 12 for generating a unidirectional signal representative of the magnitude of the signal being evaluated. Detector 12 may also be any one of numerous detector arrangements known in the art. For some applications of the invention detector 12 may be linear, for example, a peak detector, while for other applications detector 12 may be nonlinear, for example, a logarithmic detector.

Signals developed at the output of detector 12 are supplied to threshold detectors 14, low-pass filter 15 and analog-to-digital converter 16. Threshold detectors 14 are employed in well-known fashion to generate signals for indicating whether the detector output is within a prescribed amplitude range. Typically, the output of detector 12 is adjusted via amplifier 11 to be within a 10 volt range for a linear detector, or a 10 decible range for a logarithmic detector. Such threshold detectors are commonly referred to as window detectors and are now well known in the art.

Output signals from threshold detectors 14 are supplied to autoranging control 20. Autoranging control 20 is employed to generate a signal for controlling the gain of amplifier 11 and to generate signals for illuminating individual elements of display unit 25. Autoranging control 20 may include a plurality of attenuator pads and flip-flop circuits (not shown) responsive to outputs from threshold detectors 14 for inserting or removing attenuation in a circuit path as required to generate a signal for controlling the gain of amplifier 11. The logical output from the flip-flop circuits is representative of the attenuation needed to maintain the signal developed at the output of detector 12 within a prescribed amplitude range and, hence, represents the long term average value of the most significant digit(s) of the signal being evaluated. Signals representative of this logical output from autoranging control 20 are supplied to decoder-driver unit 21 which, in turn, generates signals for illuminating, in well-known fashion, appropriate elements of display unit 25. In this example, unit 25 includes seven individual elements which are selectively illuminated to form a desired numeral or the like. Additional display units may be employed as required for yielding a visual display of the most significant digits of the signal being evaluated.

Low-pass filter 15 is employed to smooth in well-known fashion the output signal from detector 12. The time constant of filter 15 is similar to that of the feedback path including threshold detectors 14 and autoranging control 20. In this example, the output signal from detector 12 is being maintained within a prescribed amplitude window of 10 units. Therefore, the output of filter 15 is representative of the least significant digit of the long term average amplitude value of the signal being evaluated. This long term average signal is converted via analog-to-digital converter 30 into binary coded decimal (BCD) form. In turn, the BCD signals are supplied to decoded-driver unit 31 which generates signals for illuminating appropriate ones of the elements of display unit 32. Unit 32 also includes seven elements which are selectively illuminated to form a desired numeral or the like. Thus, in this example, display units 25 and 32 are employed to yield a visual indication of the long term average value of the signal being evaluated.

Analog-to-digital converter 16 is utilized to generate signals in binary coded decimal form (BCD) representative of the instantaneous amplitude of the least significant digit of the signal being evaluated. Since the output of detector 12 is being maintained within a prescribed amplitude window, for example 10 volts or 10 decibels, only four digits are required to represent the least significant digit, as is well known in the art. The BCD signals are supplied to BCD-to-digits converter unit 35. Output signals from unit 35 are logical signals representative of the instantaneous amplitude of the least significant digit of the signal being evaluated. That is to say, the logical output from unit 35 represents the temporal amplitude value of the least significant digit of the signal being evaluated, i.e., the instantaneous variations from the long term average value. These logical signals are supplied via logic network 36 in a predetermined code, in accordance with the invention, to individual elements of the display unit 40.

In this example, display unit 40 also includes seven elements which may be selectively illuminated to form numerals, or the like, as desired. However, in the practice of this invention, it is desired to obtain a visual indication of the instantaneous value of the least significant digit of the long term amplitude value being displayed via display units 25 and 32. This is achieved by supplying the logical output from BCD-to-digits converter 35 via logic network 36 in a prescribed code format to illuminate selectively the elements of display unit 40. Since in this example an amplitude range of 10 units is employed, digits from 0 to 9 are assigned in pairs to five of the seven elements of display unit 40. This is realized by employing OR gates in logic network 36 in well known fashion.

In operation of the invention, the long term average value of a signal being evaluated is displayed via display units 25 and 32 as explained above. The instantaneous variations from the long term average value are displayed via the individual elements of display unit 40. Specifically, the intensity of illumination of the individual elements of display unit 40 is proportional to the time interval that the temporal value of the least significant digit of the signal amplitude being evaluated has a value assigned to the elements. Thus, a visual indication of the instantaneous variations in the least significant digit of the signal is obtained by observing the relative brightness of the individual elements of display unit 40.

Consider an example in which the long term average value of a signal being evaluated is 53. Consequently, elements of display unit 25 are illuminated to form the numeral 5, while elements of display unit 32 are illuminated to form the numeral 3. Display unit 40 is arranged as described above so that five of its elements are individually illuminated in response to signals representative of the instantaneous value of the least significant digit. Thus, if the least significant digit is 3 or 4 most of the time an element assigned to those values is most brightly illuminated. If the least significant digit is occasionally 1 or 2, or 5 or 6, the individual elements assigned to those particular values are dimly illuminated. An operator viewing a display including display units 25, 32 and 40 would have a visual indication of the long term average value, 53, and an indication of the range of the instantaneous variations in the least significant digit of the amplitude value by viewing the intensity of illumination of the individual elements of display unit 40. In this example, the elements of display unit 40 assigned to digits 3 and 4 is most brightly illuminated and, therefore, readily detected by the operator.

The above described arrangements are of course merely illustrative of the application of the principles of this invention. Numerous other arrangements may be devised by those skilled in the art without departing from the spirit and scope of this invention. For example, a display unit having 10 individual elements may be readily employed in place of display unit 40 to yield a visual indication of the instantaneous value of the least significant digit of a signal being evaluated.

What is claimed is:

1. In a display system of the type including a plurality of numeric display units for yielding a visual indication of the long term average amplitude value of a supplied signal, wherein the improvement comprises:

means for obtaining a visual indication of instantaneous variations in at least the least significant digit of the amplitude value of a supplied signal including, display means having a plurality of illuminatable elements, specific amplitude values being assigned to individual ones of said elements in accordance with a pre-established code scheme, means responsive to a supplied signal for generating digital signals representative of the instantaneous amplitude value of said supplied signal, and means for supplying said digital signals in a predetermined relationship to individual ones of the elements of said display means, wherein the intensity of illumination of said elements is proportional to the time interval that the instantaneous amplitude value of said supplied signal is at the amplitude value assigned to said elements and wherein said illuminatable elements are arranged in a predetermined spatial relationship so that an observer may perceive a range of the instantaneous variations in said at least least significant digit of the amplitude value of said supplied signal by viewing the intensity of illumination of said elements.

2. Apparatus as defined in claim 1 further including means for generating a signal representative of the amplitude of said supplied signal and wherein said digital signal generating means includes means for converting said amplitude signal into digital signals in accordance with a prescribed code scheme.

3. Apparatus as defined in claim 2 further including means for controlling the amplitude level of said supplied signal to be within a prescribed range.

4. Apparatus as defined in claim 3 wherein said amplitude signal generating means includes detector means for generating a unidirectional signal representative of the amplitude of the supplied signal in accordance with a predetermined relationship and wherein said amplitude controlling means includes controllable amplifier means for maintaining the amplitude of said supplied signal within a prescribed amplitude range and means responsive to said unidirectional signal for generating signals for controlling said amplifier means.

5. Apparatus as defined in claim 4 wherein said converting means includes an analog-to-digital converter for generating signals in binary coded decimal form representative of the instantaneous value of said unidirectional signal and means for converting said binary code decimal signal into logical signals representative of individual digits in accordance with a predetermined relationship, said logical signals supplied to predetermined ones of said display unit elements in a prescribed relationship.

* * * * *